Nov. 24, 1931.  A. J. SMITH  1,833,623
COMBINED TRANSFER, TAKE-OUT, AND BLOWHEAD SUPPORT FOR GLASS SHAPING APPARATUS
Filed March 31, 1928  3 Sheets-Sheet 1

INVENTOR.
Algy J. Smith
BY Robson D Brown
ATTORNEY.

Nov. 24, 1931.   A. J. SMITH   1,833,623
COMBINED TRANSFER, TAKE-OUT, AND BLOWHEAD SUPPORT FOR GLASS SHAPING APPARATUS
Filed March 31, 1928   3 Sheets-Sheet 2
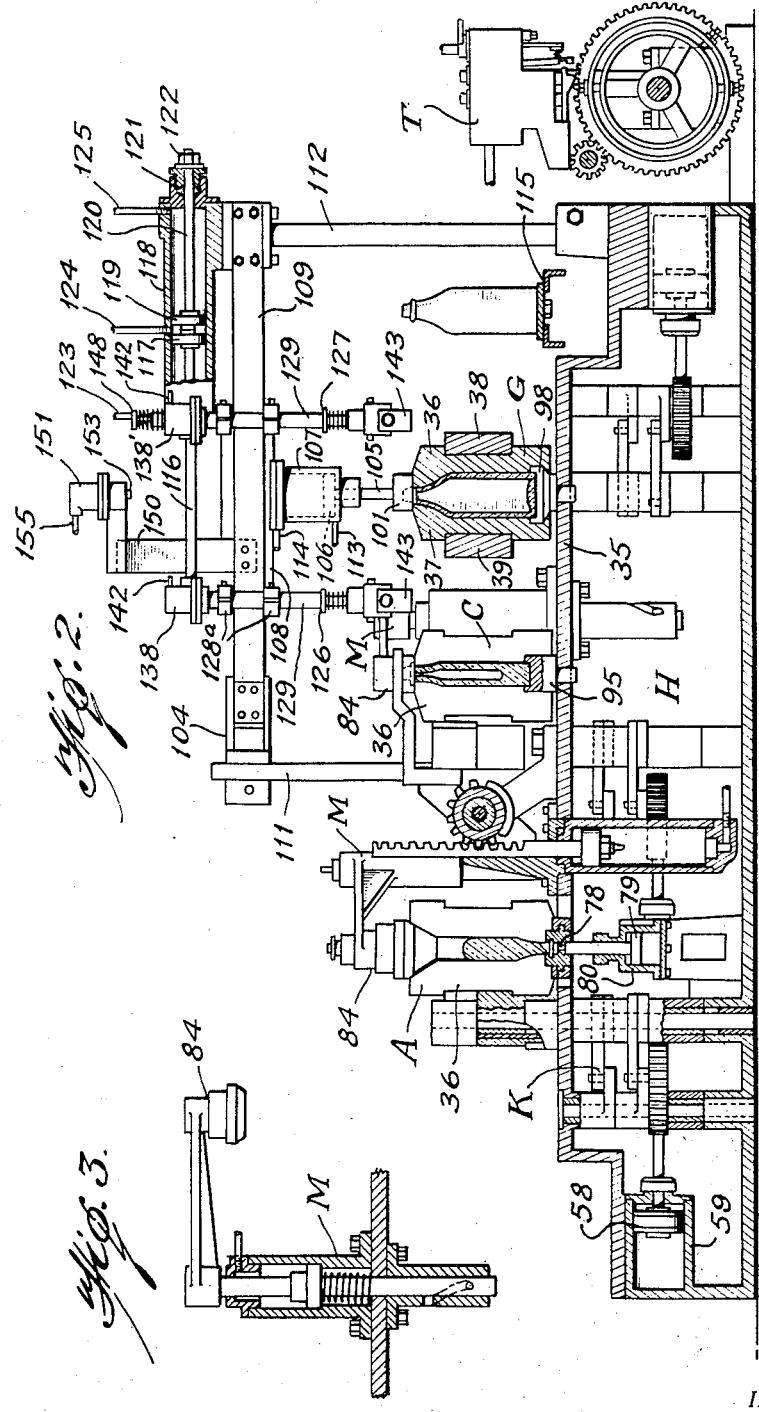
INVENTOR.
Algy J. Smith
BY Robson D Brown
ATTORNEY.

Nov. 24, 1931.  A. J. SMITH  1,833,623
COMBINED TRANSFER, TAKE-OUT, AND BLOWHEAD SUPPORT FOR GLASS SHAPING APPARATUS
Filed March 31, 1928   3 Sheets-Sheet 3
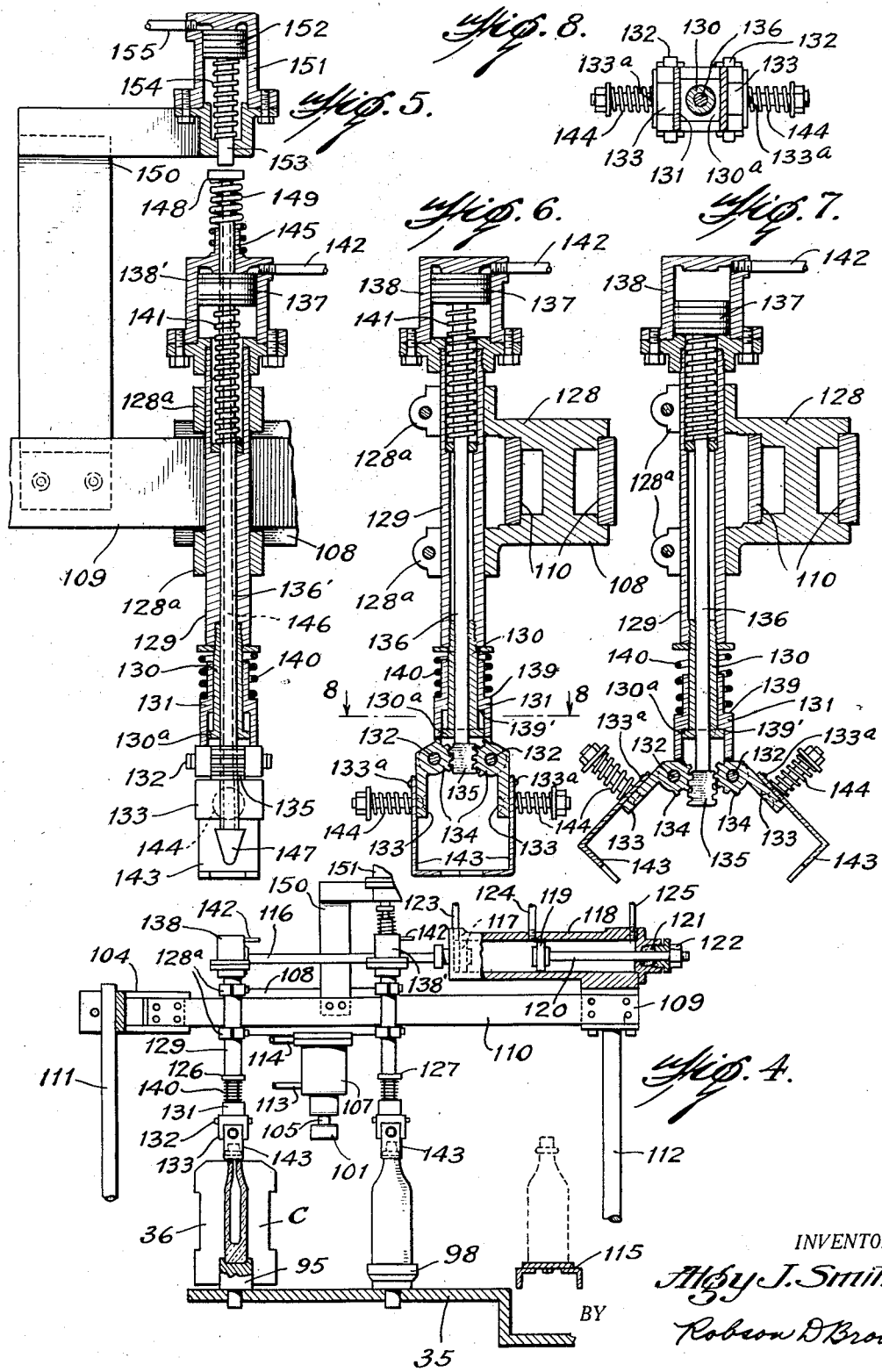
INVENTOR.
Alby J. Smith.
BY
Robson D Brown
ATTORNEY.

Patented Nov. 24, 1931

1,833,623

UNITED STATES PATENT OFFICE

ALGY J. SMITH, OF HARTFORD, CONNECTICUT, ASSIGNOR TO HARTFORD-EMPIRE COMPANY, OF HARTFORD, CONNECTICUT, A CORPORATION OF DELAWARE

COMBINED TRANSFER, TAKE OUT, AND BLOWHEAD SUPORT FOR GLASS SHAPING APPARATUS

Application filed March 31, 1928. Serial No. 266,320.

My invention relates generally to apparatus for shaping hollow glassware by blowing operations, and more particularly to a combined parison transfer, article take-out and blowhead supporting mechanism.

An apparatus embodying the invention may be used to advantage with a glass shaping machine which essentially comprises a blank mold, a counterblow mold associated therewith, and a final blow mold associated with the counterblow mold and in which a glass parison is blown to final form to produce a finished article while a succeeding blank is being counterblown in the counterblow mold for subsequent transfer to the final blow mold.

An object of the present invention is to provide relatively simple, efficient and reliable mechanism for simultaneously taking out a finished article of glassware from the final blow mold and a parison from the counter blow mold, for then transferring the finished article to an adjacent conveyor and at the same time transferring the parison to the final blow mold, and for then positioning a blowhead in operative relation to the final blow mold when a parison has been placed therein and maintaining the blowhead in such operative position for the time required to blow the parison to final form in the final blow mold.

A practical embodiment of the invention is illustrated in the accompanying drawings as incorporated in an organized glassware shaping machine which, aside from the above mentioned parison transfer, article take-out and blowhead supporting and operating mechanism and features arising therefrom and set out in the appended claims, forms no part of the present invention, but is the invention of Henry W. Ingle and is fully illustrated, described and claimed in his application, Ser. No. 266,339, filed March 31, 1928.

In the drawings:

Fig. 2 is a vertical section through the apparatus shown in Fig. 1, the view being taken substantially along the line X—X of Fig. 1;

Fig. 3 is a vertical sectional view showing the construction of blowhead supporting and operating mechanism for the settle blow mold and for each of the counterblow molds of the shaping machine shown in Figs. 1 and 2;

Fig. 4 is a vertical section through a portion of the machine with parts omitted, showing particularly the combined transfer, take-out and blowhead supporting mechanism of the present invention; and Figs. 5 to 8, inclusive, are relatively enlarged sectional views showing details of the improved transfer and take-out mechanism. Fig. 8 being a section along the line 8—8 of Fig. 6.

Figure 1:
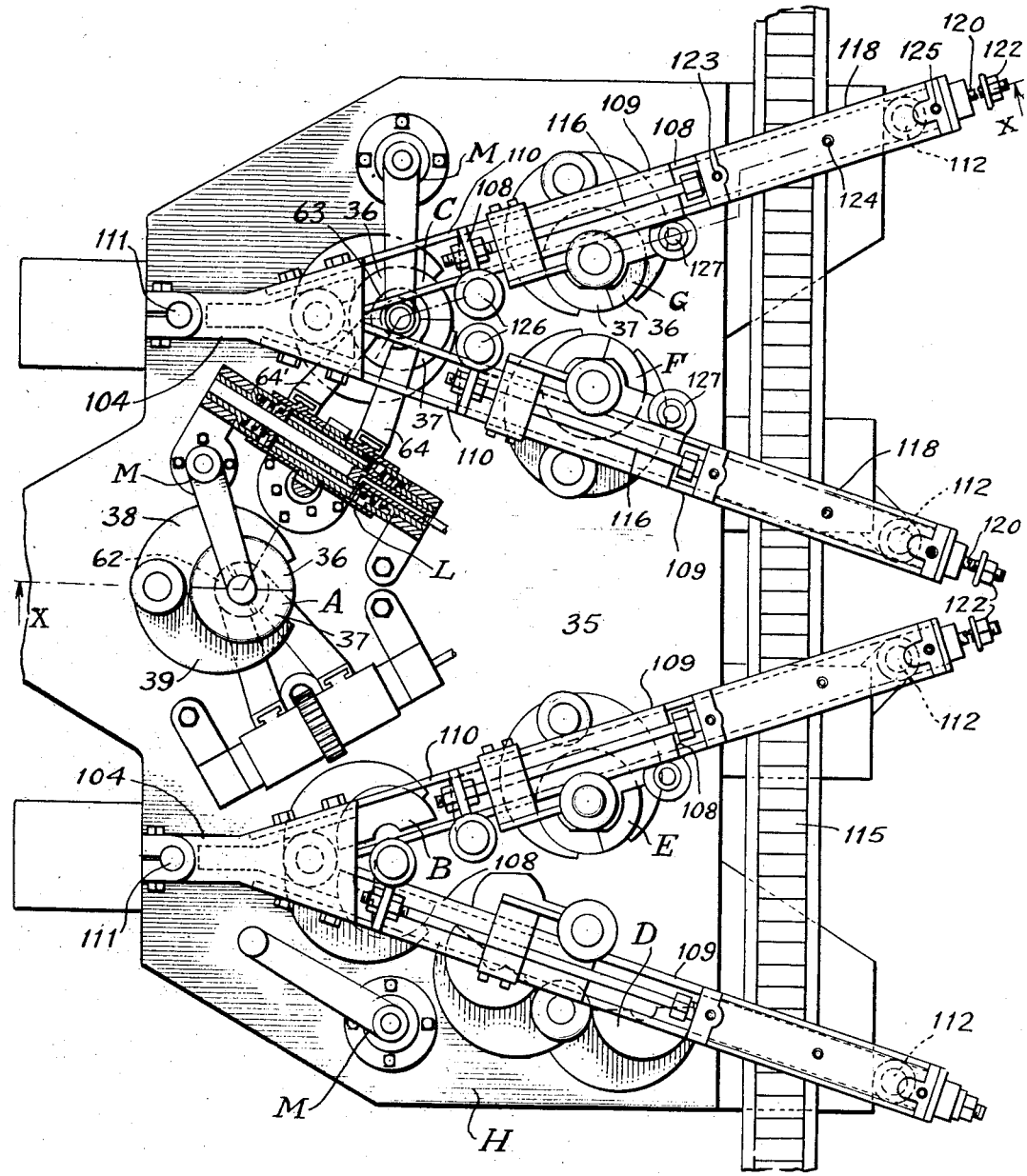
Figure 1 is a plan view, partly in section, of the shaping machine of the aforesaid application of Henry W. Ingle, equipped with my improved transfer, take-out and blowhead supporting mechanism.

Referring now to the drawings, and more particularly to Figs. 1 to 3, inclusive, the organized shaping machine shown therein comprises a settle blow mold A into which a mold charge is initially introduced and in which a neck finish and preliminary configuration is imparted to the body portion of the glass blank while the blank is in inverted position. The machine preferably comprises a pair of counterblow molds B and C, respectively, to which alternate blanks are transferred from the blank mold A and in which such blanks are counterblown while the blanks are in an upright position. Two pairs of finish blow molds D—E, and F—G, respectively, are associated with the counterblow molds B and C. Counterblown blanks are transferred from the counterblow mold B to the final blow molds D and E, alternately, and from the counterblow mold C to the final blow molds F and G, alternately, by transfer mechanism embodying the present invention and in a manner to be presently described. Such counterblown blanks or parisons are blown to final form in the final blow molds.

The molds A, B, C, D, E, F and G are all mounted in suitable relation upon a base 35 which may also constitute the top of a housing H for the mold opening and closing mechanisms which may be similar for all the molds. Each mold may comprise two mold halves or sections 36 and 37 respectively. The mold halves or sections of each mold are carried respectively by pivoted mold holders 38 and 39, whereby the molds may be opened and closed at suitable times to permit their cooperation in the fabrication of a finished article of glassware from a glass mold charge. The supporting and operating mechanism for each of the molds may include a fluid pressure cylinder 59 having a piston 58 reciprocable therein for actuating the mold holders through suitable connections indicated generally at K for the settle blow mold in Fig. 2 to open and close the mold at the proper time. The piston 58 may have pressure fluid admitted to and exhausted from opposite ends thereof through suitable pipes, not shown, which may lead from a timer and valve mechanism, generally indicated at T in Fig. 2. Since the mold opening and closing mechanism may be the same for each of the molds and per se forms no part of the present invention, a further description thereof is thought to be unnecessary for a thorough understanding of the invention that is to be claimed in this application. However, such mold opening and closing mechanism is more particularly illustrated and described in the aforesaid application of Henry W. Ingle, Serial No. 266,339.

Sectional neck rings 62, 63 are respectively associated with the counterblow molds B and C and alternately cooperate with the settle blow mold A. These neck rings serve both to impart a neck finish to blanks in the settle blow mold and to transfer blanks from the settle blow mold A to the respective counterblow molds B and C. These neck rings and their operating mechanisms are described in detail in the aforesaid application of Henry W. Ingle, Serial No. 266,339, and, therefore, need not be particularly described herein, although it may be noted that the sections of each of such neck rings may be carried on a pair of vertically adjustable pivoted arms 64, 64' and that suitable operating mechanism, generally indicated at L, Fig. 1, is provided for actuating the arms 64, 64' to open and close the sections of the neck ring and to swing them about a horizontal axis from a position below the settle blow molds A to a position above the counterblow mold B or C. Such operating mechanism may include pneumatic cylinders to which operating pressure fluid may be admitted and from which such fluid may be exhausted at suitable times which may be determined by the timer and valve mechanism T.

The settle blow mold A may have a neck plunger 78 associated therewith for cooperating with a neck ring 62 or 63 during the settle blowing of a blank in the mold A. Such neck plunger may be carried by a piston 79 reciprocating in a vertical cylinder 80 located in the housing H. Pressure fluid may be admitted to and exhausted from the cylinder 80 to raise and lower the neck plunger 78 at the proper times, which may be determined by the timer and valve mechanism T.

The settle blow mold A and the counterblow molds B and C may have similar blowheads 84 associated therewith and each moved periodically into and out of fluid pressure delivering relation to the upper end of the associated mold by blowhead supporting and operating mechanism, generally indicated at M. Such blowhead supporting and operating mechanism functions to swing the blowhead to a position at one side of the associated mold when the blowhead is in its inactive or non-pressure delivering position. Further description of the blowhead operating and supporting mechanism is deemed unnecessary herein, but a more complete description of such mechanism will be found in the aforesaid application of Henry W. Ingle, to which reference may be had if a more complete understanding of the specific details of the blowhead operating mechanism is desired. It may be stated however, that such blowhead operating mechanism may include penumatic means which may be actuated at times determined by the operation of the timing and valve mechanism T.

Each counterblow mold B and C is provided with a bottom plate 95. Each of the final blow molds D, E, F and G is provided with a bottom plate 98. Each of the final blow molds also is provided with a blowhead 101 which is carried by a piston rod 105 of a piston 106 that is mounted for reciprocation in a vertical cylinder 107. Air under pressure for application to the final blow mold when the final blowhead is in blowing relation thereto, may be supplied to the blowhead in any suitable manner for a period which may be determined by the timer and valve mechanism T. The operating mechanisms just described for the final blowheads are movably supported by structure which forms part of the subject matter that is to be claimed in the present application. The final blowheads may be raised and lowered by admitting air to and exhausting air from the opposite ends of each of the cylinders 107 alternately, as through the pipes 113 and 114, respectively, and the admission and exhaust of such operating air may be controlled by the aforesaid timer and valve mechanism T.

Such timer and valve mechanism may be identical in essential respects with the construction fully illustrated and described in the copending application of Henry W. Ingle, Serial No. 735,079, filed August 30, 1924, and, therefore, such timer and valve mechanism is shown only diagrammatically in Fig. 2 and will not be further described herein.

Apparatus embodying features of the present invention will now be particularly described. Such apparatus may comprise a track 109 extending above each final blow mold and above the associated counterblow mold, as clearly shown in Fig. 1. Each track may comprise parallel rails 110. The two tracks 109 for the finish blow molds which are associated with each counterblow mold may converge and be secured together by a yoke 104 adjacent to such counterblow mold, thus producing a substantially Y-shaped formation which may be supported at its stem by a vertical post 111 while the outer ends of the tracks 109 constituting the branches of such Y-shaped formation are supported by separate vertical posts 112. All such posts may be carried by the base 35.

A carriage 108 is mounted for sliding movement on each of the tracks 109. Such carriage supports the cylinder 107 of the blow-head operating mechanism for the particular final blow mold over which that track extends. Each carriage also supports transfer and take-out mechanism for simultaneously transferring a counterblown blank from a counterblow mold to the final blow mold, and a finished article of glassware from the final blow mold to an adjacent conveyor 115. As all of the transfer and take-out mechanisms for the several final blow molds are the same, only one will be specifically described.

Such track 109 is supported, as by the posts 111—112, above a final blow mold (as G) and its associated counterblow mold C, Figs. 1 and 2. Each carriage 108, heretofore described, is mounted for reciprocation on the track, Figs. 1, 2 and 4, being propelled through suitable connections by piston rod 116 of a piston 117 mounted for reciprocation in a cylinder 118. The latter is mounted at the outer end of the track. A second piston 119 is mounted in the cylinder 118 and is provided with a piston rod 120 extending outwardly through the cylinder and through a suitable stuffing box 121. The piston rod 120 terminates in an adjustable head or nut 122 adapted to regulably limit the throw of the piston 119 toward the piston 117. The cylinder 118 is provided with three pipes, 123, 124, 125, for the controlled admission and exhaust of compressed air to and from the cylinder. As shown (Figs. 2 and 4), the pipe 124 enters the cylinder 118 at a point to the left of the piston 119 when that piston is at the end of its throw to the left, while the pipes 123 and 125 respectively enter the cylinder 118 at the left and right hand ends thereof.

It is apparent that with this arrangement and by suitable control of the admission and exhaust of air through the several pipes, the carriage and the parts carried thereby may be positively and accurately moved to and positioned at three different positions.

Mounted on the carriage 108, in addition to the final blowhead and on either side thereof, are the transfer and take-out tong mechanisms 126 and 127, the mechanism 126 being provided to effect the transfer of the counterblown blank to the final blow mold and the mechanism 127 being supplied to take out the finished bottle and deposit it on the buck or conveyor 115. The mechanisms 126 and 127 are in general similar, save that the mechanism 127 is provided with a means for steadying the bottle while being grasped by the take-out tongs, which mechanism is not shown in the mechanism 126. The transfer mechanism 126 (see Figs. 2, 4, 6 and 7) comprises a suitable bracket 128 attached to the carriage 108 and having clamp portions 128a in which is mounted a vertically adjustable barrel 129. Into the lower end of the barrel 129 is screwed a sleeve 130 having smaller exterior dimensions than the barrel, and over this sleeve is slidably mounted a second sleeve 131 provided at its lower end with suitable studs or shafts 132, upon which are pivoted tong finger supporting members 133. Each of these supporting members is provided with a gear sector 134 adapted to mesh with the teeth of one side of a double-sided rack 135 formed at the lower end of a piston rod 136 which passes upwardly through the sleeve 130 and the barrel 129 and is attached to a piston 137 that is adapted to reciprocate in a cylinder 138 which is suitably mounted at the upper end of the barrel 129. The slidable sleeve or head 131 is provided with upper and lower shoulders 139 and 139′, respectively. A compression coil spring 140 is provided between the shoulder 139 and the lower end of the barrel 129 and tends to force the sleeve 131 and the tong supporting members downwardly from the position shown in Fig. 6 to the position shown in Fig. 7. A flange 130a on the lower end of the sleeve 130 serves as a stop for engaging with the shoulder 139′ to prevent downward movement of the sleeve 131 from the position shown in Fig. 7. When the piston moves away from its upper position, it compresses a coil spring 141 arranged within the barrel 129 and beneath the piston 137. The spring 141 returns to its upper position when air is exhausted from above the piston. A pipe 142 enters the cylinder above the piston to supply and exhaust compressed air under the control of a suitable valve and timing device, such as that shown at T in Fig. 2. Tong fingers 143 are mounted on the supports 133 and are preferably attached thereto at 133a so as to be capable of limited swinging movement away from such supports. Spring attachments 144 exert an adjustable spring clamping action on the tong fingers to hold them normally against swinging away from their supports but to permit such swinging movements should such fingers strike an obstruction or be subjected otherwise to an abnormal stress.

The take-out mechanism 127 is similar in structure and operation to the mechanism 126 except that the piston rod 136′ of the transfer mechanism is hollow and extends through the piston and through a suitable stuffing box 145 at the top of the cylinder 138'. Through this hollow piston rod 136' extends a rod 146 terminating in a suitable head 147 adapted to enter the neck of the bottle and to steady it when the halves of the final blow mold are removed. The upper end of this rod is provided with a head 148 beneath which is a coil spring 149 abutting against the top of the cylinder 138' which tends to hold the steadying head in its upper or retracted position. Mounted on the track 109 is a bracket 150 carrying a cylinder 151 in which is mounted a piston 152 having a rod 153, the end of which is adapted to be moved downwardly into contact with the head 148 to project the steadying head 147 into the neck of the bottle. A coil spring 154 beneath the piston head normally maintains the piston 152 in its upper position from which it is moved by compressed air supplied through a pipe 155 at suitable times.

The operation of the transfer and take-out is as follows—Starting in the position shown in Fig. 2 wherein the final blowhead is shown in final blowing position, the tongs of the mechanisms 126 and 127 are open, as shown in Fig. 7, and the steadying head 147 is retracted, as shown in Fig. 5. When the final blow is completed, air is supplied through the pipe 113 and exhausted through the pipe 114 to raise the blowhead 104, and pressure is admitted through the pipe 124 to the cylinder 118 and exhausted through the pipe 123. This causes the carriage to move to the left, positioning the mechanism 126 over the counterblow mold and the mechanism 127 over the final blow mold. Compressed air is then applied to the cylinder 151, forcing the piston rod 153 against the head 148, and forcing the steadying head 147 into the neck of the bottle in the final blow mold to hold the bottle steady while the mold opens and until the bottle is grasped by the tongs. Air is exhausted from the cylinders 138 and 138', whereupon the pistons in the mechanisms 126 and 127 rise, closing the tongs about the neck portions of the counterblown blank and the finished bottle, respectively. This closing movement is followed by an upward movement of the closed tongs, and as the molds have opened, the counterblown blank and the final bottle are lifted from the bottom plates. Air is then exhausted from the cylinder 118 through pipes 124 and 125 and supplied through the pipe 123 which will force the piston 117 to the right to a point beyond the pipe 124, thereafter pressure being admitted through pipe 124 and simultaneously through the pipe 123 will cause a throw of both pistons 117 and 119 to their extreme right hand positions, positioning the finished bottle over the buck 115 and the counterblown blank above the bottom plate 98 of the final blow mold. Air is then applied through the pipes 142 to the cylinders 138 and 138' which causes first a downward movement of the tong heads and then opens the tongs, depositing the completed bottle upon the buck 115 and the counterblown blank in the final blow mold. Air is then exhausted from the cylinder 118 through the pipe 123 and applied through the pipe 125, throwing the carriage 108 to the position shown in Fig. 2. Meanwhile, the molds close. Air then is applied through the pipe 114 to cylinder 107 and exhausted through the pipe 113 to move the finish blowhead into cooperative relation with the final blow mold and a cycle of operations of the combined parison transfer, article take-out and final blowhead operating mechanism has been completed.

The capability of vertical adjustment of the barrels 129 of the transfer and take-out means permits use of the mechanism with counterblow molds and final blow molds of different heights or located at different levels.

While I have shown and described a practical embodiment of the present invention as applied to a glassware shaping machine of a particular construction, it is to be understood that the invention may be applied to shaping machines which differ considerably in structure and operation from that shown in the accompanying drawings and that the various features of the present invention may be modified in structure, combination, and arrangement, to adapt the invention to different uses or different conditions of service, without departing from the spirit and scope of the invention as set out in the appended claims.

I claim:

1. The combination with spaced counterblow and final blow molds, of a carriage movable adjacent to said molds, a transfer mechanism carried by said carriage for removing a parison from the counterblow mold and depositing it in the final blow mold, take-out mechanism carried by said carriage for removing a finished article from the final blow mold and depositing it at a delivery station, and means for moving said carriage to effect said parison transfer and article take-out operations simultaneously.

2. The combination with spaced counterblow and final blow molds, of a carriage movable adjacent to said molds, a transfer mechanism carried by said carriage for transferring a parison from the counterblow mold to the final blow mold, take-out mechanism carried by said carriage for transferring a finished article from the final blow mold to a delivery station, and means for moving said carriage to effect parison transfer and article take-out operations simultaneously and for then moving said parison transfer and said article take-out means to out-of-the-way positions with respect to both said counterblow mold and said final blow mold.

3. The combination with spaced counter-blow and final blow molds, of a carriage movable adjacent to said molds, a transfer mechanism carried by said carriage for transferring a parison from the counterblow mold to the final blow mold, take-out mechanism carried by said carriage for transferring a finished article from the final blow mold to a delivery station, means for moving said carriage to effect said parison transfer and article take-out operations simultaneously and for then moving said parison transfer and said article take-out means to out-of-the-way positions with respect to both said counterblow mold and said final blow mold, and a blowhead carried by said carriage in position to be disposed in operative relation to said final blow mold when said parison transfer and said article take-out means are in their said out-of-the-way positions.

4. The combination in glass machinery having a counterblow mold, a final blow mold and a delivery station located in spaced relation to one another, of a track extending adjacent to said molds, a carriage movable along said track, a transfer mechanism movable with said carriage to transfer a parison from the counterblow mold to the final blow mold, a take-out mechanism movable with said carriage to transfer a finished article from the final blow mold to the delivery station, and means for moving said carriage along said track to effect said parison transfer and article take-out operations of said mechanisms simultaneously.

5. The combination in glass machinery having a counterblow mold, a final blow mold and a delivery station located in spaced relation to one another, of a track extending adjacent to said molds, a carriage movable along said track, a transfer mechanism movable with said carriage to transfer a parison from the counterblow mold to the final blow mold, a take-out mechanism movable with said carriage to transfer a finished article from the final blow mold to the delivery station, and pneumatic means for moving said carriage along said track to effect said parison transfer and article take-out operations of said mechanisms simultaneously.

6. The combination in glass machinery having a counterblow mold, a final blow mold and a delivery station located in spaced relation to one another, of a track located adjacent to said molds, a carriage movable along said track, a transfer mechanism movable with the carriage to transfer a parison from the counterblow mold to the final blow mold, a take-out mechanism movable with the carriage to transfer a finished article from the final blow mold to the delivery station, a final blowhead movable with said carriage to and from a blowing station for said final blow mold, and means for moving said carriage along said track to effect simultaneous parison transfer and article take-out operations periodically and to position said blowhead in blowing relation to said final blow mold in the intervals between successive parison transfer and article take-out operations of said mechanisms.

7. The combination in glass machinery having a counterblow mold, a final blow mold and a delivery station located in spaced relation to one another, of a track extending above said molds and said delivery station, a carriage movable along said track, a vertically adjustable transfer mechanism carried by said carriage and movable therewith for transferring a parison from the counterblow mold to the final blow mold, a vertically adjustable take-out mechanism carried by the carriage and movable therewith for transferring a finished article from the final blow mold to the delivery station, and means for moving said carriage along said track to effect simultaneous parison transfer and article take-out operations of said mechanisms.

8. The combination in glass machinery having a counterblow mold, a final blow mold and a delivery station located in spaced relation to one another, of a track extending above said molds and said delivery station, a carriage movable along said track, a vertically adjustable transfer mechanism carried by said carriage and movable therewith for transferring a parison from the counterblow mold to the final blow mold, a vertically adjustable take-out mechanism carried by the carriage and movable therewith for transferring a finished article from the final blow mold to the delivery station, said molds being adapted to open at the proper times to permit said parison transfer and article take-out operations, and an article steadying member movable into engagement with the finished article in said final blow mold for steadying said article during the period between the opening of the final blow mold and the removal of the finished article by said take-out mechanism.

9. The combination in glass machinery having a counterblow mold, a final blow mold and a delivery station located in spaced relation to one another, of a carriage, a parison transfer mechanism movable with the carriage from a position above said counterblow mold to a position above said final blow mold, a take-out mechanism movable with said carriage from a position above said final blow mold to a position above said delivery station, said transfer and take-out mechanisms each comprising a pair of pivoted gripping members mounted for limited vertical movements, and means for actuating said gripping members to move them downwardly while closed when said mechanisms are in their first named positions, then to open on continuation of downward movement and subsequently to close said gripping members to grip the article in the underlying mold, then to raise said gripping members and the article therein and to maintain said gripping members closed for supporting said article during the movement of the mechanism from its first-named to its second named position, then to lower the closed gripping members to place the article held thereby in the final blow mold or onto a conveyor at the delivery station, then to open said gripping members to release said article, said gripping members being moved while open laterally away from said article, and means for moving said carriage in timed relation to the operations of said actuating means to effect simultaneous transfer of a parison from the counterblow mold to the final blow mold and a finished article from the final blow mold to said delivery station.

10. The combination in glass machinery, of a movable carriage, a transfer mechanism movable with said carriage for transferring a glass parison from a counterblow mold to a final blow mold, a take-out mechanism movable with said carriage for transferring a finished glass article from the final blow mold to a delivery station, a vertically movable final blowhead also movable with said carriage from a position above said final blow mold when said parison transfer and said article take-out mechanisms are in idle positions intermediate the ends of their said transfer movements to a position out of vertical alignment with said final blow mold when said parison transfer and article take-out mechanisms are at either end of their said transfer movements, means for lowering said blowhead into blowing relation to said final blow mold when said blowhead is in its first named position, and means for moving said carriage to effect periodic transfer movements of said parison transfer and article take-out mechanisms and periodic movements of the blowhead to its first named position and of the parison transfer and article take-out mechanisms to their idle positions in the intervals between the transfer movements of said mechanisms.

11. The combination in glass machinery, of a movable carriage, a parison transfer mechanism movable with the carriage to transfer a parison from a counterblow mold to a final blow mold, a take-out mechanism movable with the carriage to transfer a finished article from the final blow mold to a delivery station, a final blowhead movable with the carriage to and from a blowing station for said final blow mold, a pneumatic cylinder, a piston connected to move said carriage and movable in one direction in said cylinder for a distance sufficient to effect said parison transfer and ware take-out operations of said mechanisms, a second piston movable in the opposite direction in said cylinder for causing part of the return stroke of the first named piston, whereby said blow head will be moved to its blowing position and said transfer mechanisms will be moved to out of the way positions, means for admitting fluid pressure to opposite ends of said cylinder to cause said movements of said pistons, and means for admitting pressure fluid to an intermediate portion of said cylinder to cause the remainder of the return stroke of the first named piston and the return stroke of the second named piston.

12. In glass working machinery, a movable carriage, pneumatically operated means connected to move said carriage so as to position said carriage at three fixed stations successively, and means for adjusting said pneumatically operated means to adjust the distance of one of said stations from the other stations.

13. In glass machinery, the combination with a mold in which a glass parison is formed and a mold in which the parison may be blown to final form, of a slide member arranged to move above and in a direction parallel with a line connecting the axes of said molds, means associated with said slide member for transferring a glass parison from the first named mold to the second named mold, and means also associated with said slide member to blow said parison to final form after it has been transferred to said second named mold.

Signed at Hartford. Connecticut, this 30th day of March, 1928.

ALGY J. SMITH.